United States Patent
Turner et al.

(10) Patent No.: US 12,409,815 B2
(45) Date of Patent: Sep. 9, 2025

(54) PEDESTRIAN DETECTION METHOD AND SYSTEM

(71) Applicant: Bendix Commercial Vehicle Systems LLC, Avon, OH (US)

(72) Inventors: Justin Turner, North Canton, OH (US); Justin R Miller, Elyria, OH (US); Jeffrey M Carbaugh, Lakewood, OH (US); Ryan W Allsup, Grafton, OH (US); Robin M Parsons, North Royalton, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 64 days.

(21) Appl. No.: 18/410,500

(22) Filed: Jan. 11, 2024

(65) Prior Publication Data

US 2025/0229752 A1    Jul. 17, 2025

(51) Int. Cl.
| | |
|---|---|
| *G08G 1/16* | (2006.01) |
| *B60T 7/22* | (2006.01) |
| *B60T 8/171* | (2006.01) |
| *G06V 20/58* | (2022.01) |

(52) U.S. Cl.
CPC ............... *B60T 7/22* (2013.01); *B60T 8/171* (2013.01); *B60T 2201/022* (2013.01); *B60T 2210/32* (2013.01); *G06V 20/58* (2022.01)

(58) Field of Classification Search
CPC ........................ G06V 20/58; B60W 2420/403; B60W 30/09; B60W 30/0956; G05D 1/0088; G06T 2207/30261; G08G 1/166; B60T 7/22; B60T 8/171; B60T 2201/022; B60T 2210/32
See application file for complete search history.

(56) References Cited

U.S. PATENT DOCUMENTS 9,682,689 B2 *   6/2017   Parker ..................... B60T 8/171
10,503,985 B2    12/2019   Gokan et al.
(Continued)

OTHER PUBLICATIONS

Segall, Bob, "13 Investigates: Millions of Vehicles have Unexpected, Dangerous Front Blind Zone", Retrieved from <<https://www.wthr.com/article/news/investigations/13-investigates/13-investigates-millions-vehicles-have-unexpected-dangerous-front-blind-zone/531-9521c471-3bc1-4b55-b860-3363f0954b3b>>, Published on: Apr. 25, 2019, 9 pages.

(Continued)

*Primary Examiner* — Gonzalo Laguarda
(74) *Attorney, Agent, or Firm* — Cheryl L. Greenly; Brian E. Kondas; Geoffrey A. Kudlo

(57) ABSTRACT

A vehicle system for a commercial vehicle comprises a first forward-looking camera, a service braking controller; and a driver assistance controller communicating with the first forward looking camera and the service braking controller. The driver assistance controller identifies a pedestrian as a target within the field of view of the first forward looking camera, determines a distance to the pedestrian is less than or equal to a predetermined distance, transmits a signal to the service braking controller to request deceleration of the vehicle in response to the distance to the pedestrian being less than or equal to the predetermined distance. The driver assistance controller maintains the signal to the service braking controller until the pedestrian is no longer identified as a target.

11 Claims, 3 Drawing Sheets

(56) References Cited

U.S. PATENT DOCUMENTS

| | | | |
|---|---|---|---|
| 11,644,834 B2* | 5/2023 | Ditty | G06F 15/7807 701/23 |
| 11,787,402 B2* | 10/2023 | Edo Ros | B60T 7/12 701/70 |
| 2022/0406076 A1 | 12/2022 | Horiuchi et al. | |

OTHER PUBLICATIONS

Cleave, Kris Van, "Blind Zones in Front of Suvs and Trucks can Lead to Deadly Crashes. The Victims are often Children, Experts Say", Retrieved from <<https://www.cbsnews.com/news/suv-blind-zone-deaths-consumer-reports-safety/>>, Published on: Oct. 31, 2022, 1 page.

"Nissan Frontier 2023 Automatic Emergency Braking User Guide", Retrieved from <<https://www.autouserguide.com/nissan/frontier/nissan-frontier-2023-automatic-emergency-braking-user-guide/>>, Published on: Dec. 30, 2022, 11 pages.

* cited by examiner

PEDESTRIAN DETECTION METHOD AND SYSTEM

BACKGROUND

The present application relates to a system, controller and method to provide precise target information when a commercial vehicle equipped with automatic emergency braking (AEB) detects forward targets.

In commercial vehicle applications, different systems control service braking, lane departure warning, parking and automatic emergency braking. Different sensors, such as cameras and radars, throughout the vehicle provide the information used in these systems to determine target identification before and during implementation of automatic emergency braking.

Some commercial vehicles are also equipped with pedestrian automatic emergency braking. Pedestrian automatic emergency braking requires at least one forward facing camera. Pedestrians are various heights and may fall within a front blind spot of commercial vehicles when the camera is mounted behind the windshield. As the commercial vehicle moves closer to the target, the pedestrian may become fully immersed in the front blind spot. Therefore, there is interest in improving the functionality of pedestrian automatic emergency braking based on the sensor input and knowledge of the target position.

SUMMARY

In accordance with one embodiment, a vehicle system for a commercial vehicle comprises a first forward-looking camera, a service braking controller; and a driver assistance controller communicating with the first forward looking camera and the service braking controller. The driver assistance controller identifies a pedestrian as a target within the field of view of the first forward looking camera, determines a distance to the pedestrian is less than or equal to a predetermined distance, transmits a signal to the service braking controller to request deceleration of the vehicle in response to the distance to the pedestrian being less than or equal to the predetermined distance. The driver assistance controller maintains the signal to the service braking controller until the pedestrian is no longer identified as a target.

In accordance with another embodiment, a method for controlling a commercial vehicle comprises detecting a pedestrian with at least one forward camera, determining a distance to the pedestrian is less than or equal to a predetermined distance and transmitting a signal requesting deceleration of the vehicle as long as the pedestrian is detected less than the predetermined distance.

DETAILED DESCRIPTION

Figure 1:
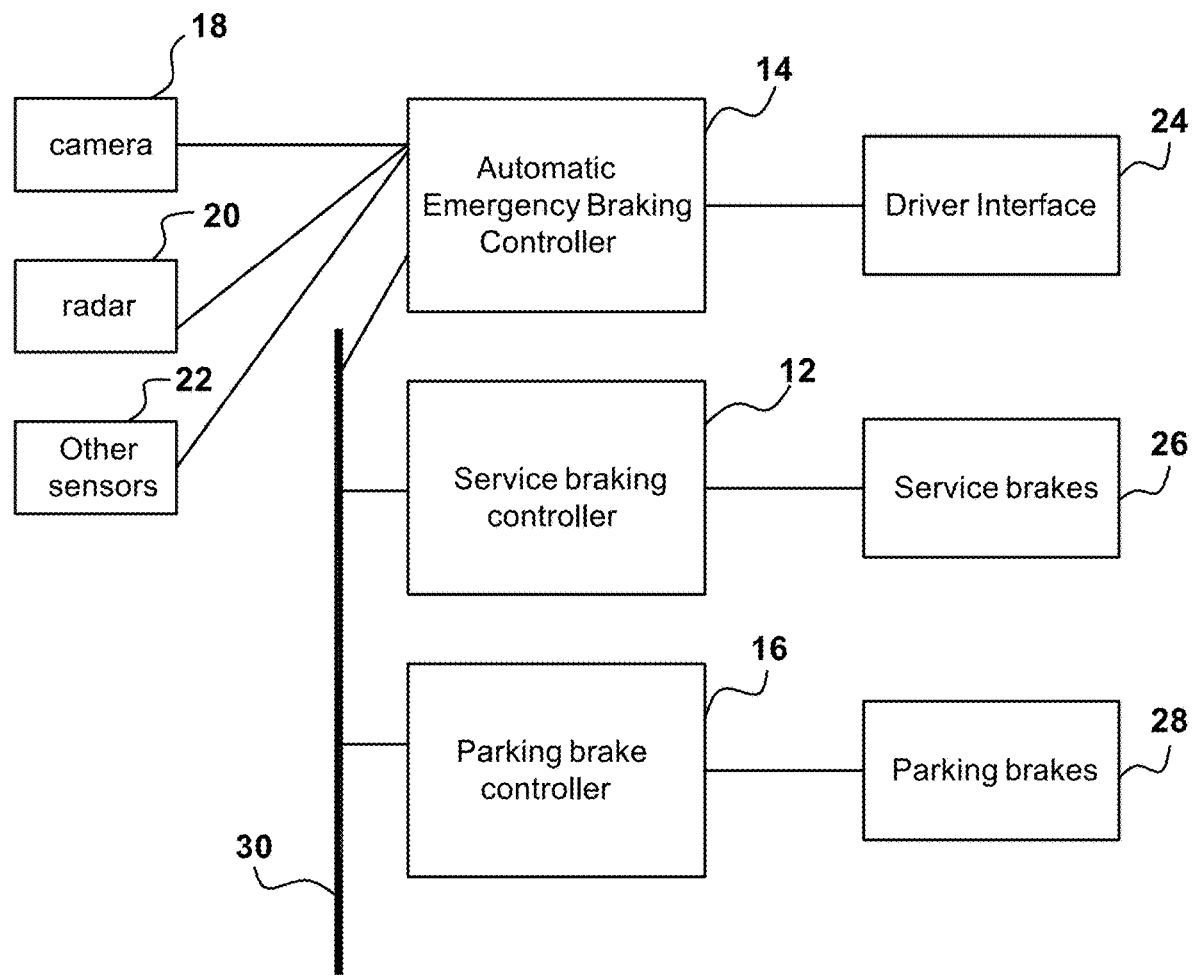
FIG. 1 is a representation of a system on a commercial vehicle according to one example of the present invention.

Referring to FIG. 1, a system 10 for a commercial vehicle according to one example of this invention is shown. The vehicle system 10 includes a braking controller 12, which controls the service brakes 26 of vehicle under certain conditions. Braking controller 12 may include functionality to control anti-lock braking and stability control. Braking controller 12 responds to signals from sensors connected directly to the braking controller 12 or responds to messages received from other controllers on the vehicle. The braking controller 12 transmits signals to activate electropneumatic devices at each wheel end to assist in slowing and stopping the vehicle before the driver intervenes or in addition to driver intervention.

The system 10 includes a driver assistance controller, such as automatic emergency braking (AEB) controller 14, which transmits messages regarding potential obstacles in front of the vehicle. The AEB controller 14 may receive information about the obstacles from sensors affixed to the vehicle and looking to the front of the vehicle, such as forward-looking camera 18, radar 20 and other sensors 22. Specifically, the AEB controller 14 is looking for other vehicles traveling on the same roadway that may be slowing down or moving into the host vehicle's lane of travel. In general, the AEB controller 14 identifies targets based on the trajectory of the host vehicle and potential targets in the path of the host vehicle. A following distance alert is triggered when the host vehicle is within a pre-programmed distance from the target. Automatic emergency braking is requested by the AEB controller 14 when a preselected distance between the host vehicle and the target is breached.

A first camera 18 has a defined area of view of the front of the vehicle. The area of view is dependent upon the height at which the camera 18 is installed in the cab and the length of the hood of the vehicle. The camera 18 will use processing algorithms to identify whether a forward obstacle is another vehicle, a pedestrian or a traffic sign, for example. Other cameras may be installed at other locations on the vehicle, such as a driver-facing camera or a side object detection camera. The radar 20 is also positioned to scan the forward area of the vehicle for potential obstacles in the path of travel of the vehicle. The AEB controller 14 uses information from both the camera 18 and radar 20 to determine size, type and speed of targets in the path of travel of the vehicle.

Pedestrian AEB is a subset of AEB that uses a forward-facing camera specifically to identify pedestrians near the vehicle. Algorithms inside the camera determine the pedestrian distance from the vehicle and transmit the information to the AEB controller 14.

The system 10 includes a parking brake controller 16, which controls the parking brakes 28 of the vehicle so that the vehicle remains stationary. The parking brake controller 16 may receive signals regarding the driver's desire to park the vehicle as well as signals from other controllers to keep the vehicle stationary.

The braking controller 12, the AEB controller 14 and the parking brake controller 16 communicate on a vehicle serial communication bus 20. Messages may be transmitted and received using a known protocol, such as SAE J1939, on the communication bus 30.

The system 10 includes a driver interface 24. The driver interface may include a switch to turn on or off certain features of system 10. The driver interface 24 may also include a lamp or display to indicate the status of the system 10.

The AEB controller 14 transmits messages on the communication bus 30 when the controller 14 determines that service braking may be necessary to mitigate a collision with a detected object. The level of braking requested depends on the velocity of the vehicle and the location of the target. The level of braking may also depend on the available braking power within the service braking system of the vehicle. For example, in a pneumatic braking system, the level of braking available is limited by the amount of pressure stored in the service braking reservoirs. The braking controller 12 responds to the messages by activating the service brakes automatically to slow or stop the vehicle. When the target is no longer being tracked, the AEB controller 14 may discontinue sending messages requesting service brake application. The parking brake controller 16 may be used to keep the vehicle stationary after a service brake application, depending on the messages from the AEB controller 14.

In another example, the functions of each controller 12, 14, 16 may be combined in a single controller.

Therefore, a vehicle system for a commercial vehicle comprises a first forward-looking camera, a service braking controller; and a driver assistance controller communicating with the first forward looking camera and the service braking controller. The driver assistance controller identifies a pedestrian as a target within the field of view of the first forward looking camera, determines a distance to the pedestrian is less than or equal to a predetermined distance, transmits a signal to the service braking controller to request deceleration of the vehicle in response to the distance to the pedestrian being less than or equal to the predetermined distance. The driver assistance controller maintains the signal to the service braking controller until the pedestrian is no longer identified as a target.

Figure 2:
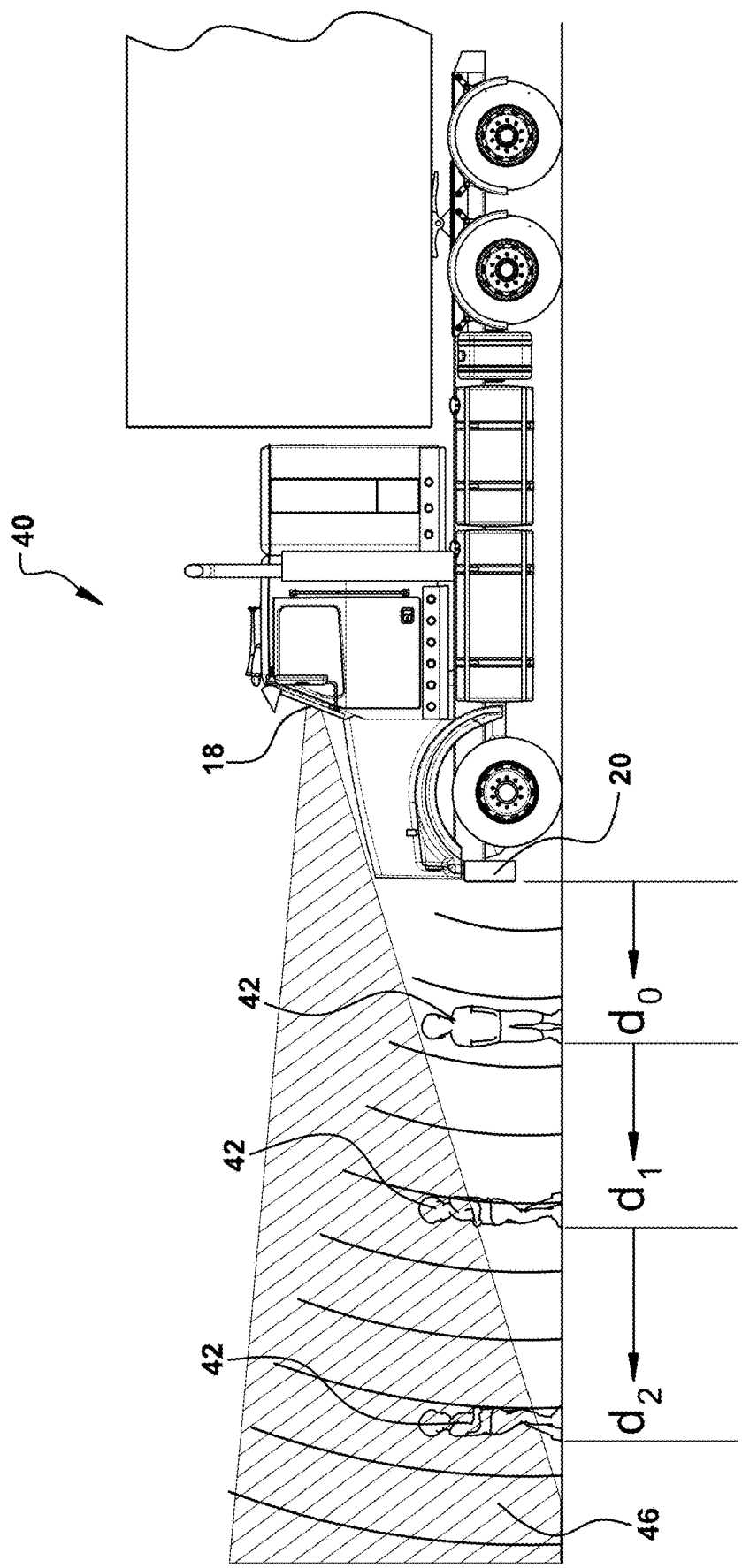
FIG. 2 is a representation of a vehicle equipped with the system as in FIG. 1 with a sample target.

FIG. 2 depicts a vehicle 40 having the system 10. The vehicle 40 is designed with the engine in the forward position, which creates a blind spot directly in front of the vehicle. The camera 18, shown as forward-facing camera mounted in the cab of the vehicle, has a field of view 44 in front of the vehicle 40, shown by the shaded area emanating from the forward-looking camera 18 located in the cab of vehicle 40. Part of the view of the camera 18 is blocked by the hood of the vehicle 40, creating a blind spot for the camera, not just the driver. The radar 20 also has a field of view 46, shown by the lines emanating from the radar 20 located on the fender of the vehicle 40. However, a radar is typically useful in identifying metallic objects, such as vehicles and signs, rather than pedestrians.

The AEB controller 14 identifies a first target as pedestrian 42 using the camera 18. The pedestrian 42 may be a person of small stature, such as a child. For example, the height of the child may be four feet, which is lower than the height of a typical hood of a commercial vehicle.

The camera 18 calculates that the pedestrian 42 is a distance d2 from the front of the vehicle 40. In one example, the distance d2 is about nine feet from the front fender of the vehicle 40. The pedestrian 42 is within the field of view 44 of the camera 18 so the entire pedestrian body is identified by the camera 18. Dependent on the velocity of the vehicle 40, the AEB controller 14 may transmit messages to the service brake controller 12 to slow or stop the vehicle to mitigate any collision with the pedestrian 42.

The pedestrian 42 may move to a new location, d1. The pedestrian 42 may have moved or the change in distance between the vehicle 40 and the pedestrian 42 may be due to the movement of the vehicle 40. The pedestrian 42 is mostly within the field of view 44 of the camera 18, but the entire pedestrian body is not identified by the camera 18. Dependent on the velocity of the vehicle 40, the AEB controller 14 will transmit messages to the service brake controller 12 to slow or stop the vehicle 40 to mitigate any collision with the pedestrian 42.

The pedestrian 42 may move to a new location, do. Without this invention, the AEB controller 14 may deactivate any service brakes since the pedestrian 42 is no longer within the field view of the camera 18 and therefore is no longer identified as a target. With this invention, as the pedestrian 42 moves in and out of the field of view 44 of the camera 18, the AEB controller 14 maintains the service brake request as active. The AEB controller 14 uses historical data of the position of the pedestrian 42 when the pedestrian 42 is no longer within the field of view of the camera 18. If the pedestrian 42 is not seen by camera 18 as moving outside of the blind spot, then the AEB controller 14 will request that the parking brake controller 16 activate the parking brakes to keep the vehicle 40 from moving. The AEB controller 14 assumes that the pedestrian 42 is in the same position since they were not detected as moving out of the blind spot.

While the pedestrian 42 is being reliably detected by the camera 18, the AEB controller 14 includes the logic to manage the dynamics of the event, such as host vehicle velocity, pedestrian velocity, host vehicle acceleration, longitudinal distance to determine the likelihood that under the dynamic condition the pedestrian 42 will enter the front blind spot. When this determination is made, the AEB controller 14 may set an internal flag. As the event continues and if the pedestrian detection becomes unreliable because the pedestrian 42 is moving into the front blind spot, the AEB controller 14 shall continue to transmit the braking request to the service braking controller 12.

In another embodiment, an alert may be given to the driver of the vehicle 40 via the driver interface 24 when the AEB controller 14 determines that the pedestrian 42 remains within the blind spot.

In another embodiment, the other sensors 22 may include a second forward facing camera added to the fender of the vehicle 40 near the radar 20. The second camera will be used by the AEB controller 14 to confirm whether the pedestrian 42 is still within the blind spot of the first camera 18.

Figure 3:
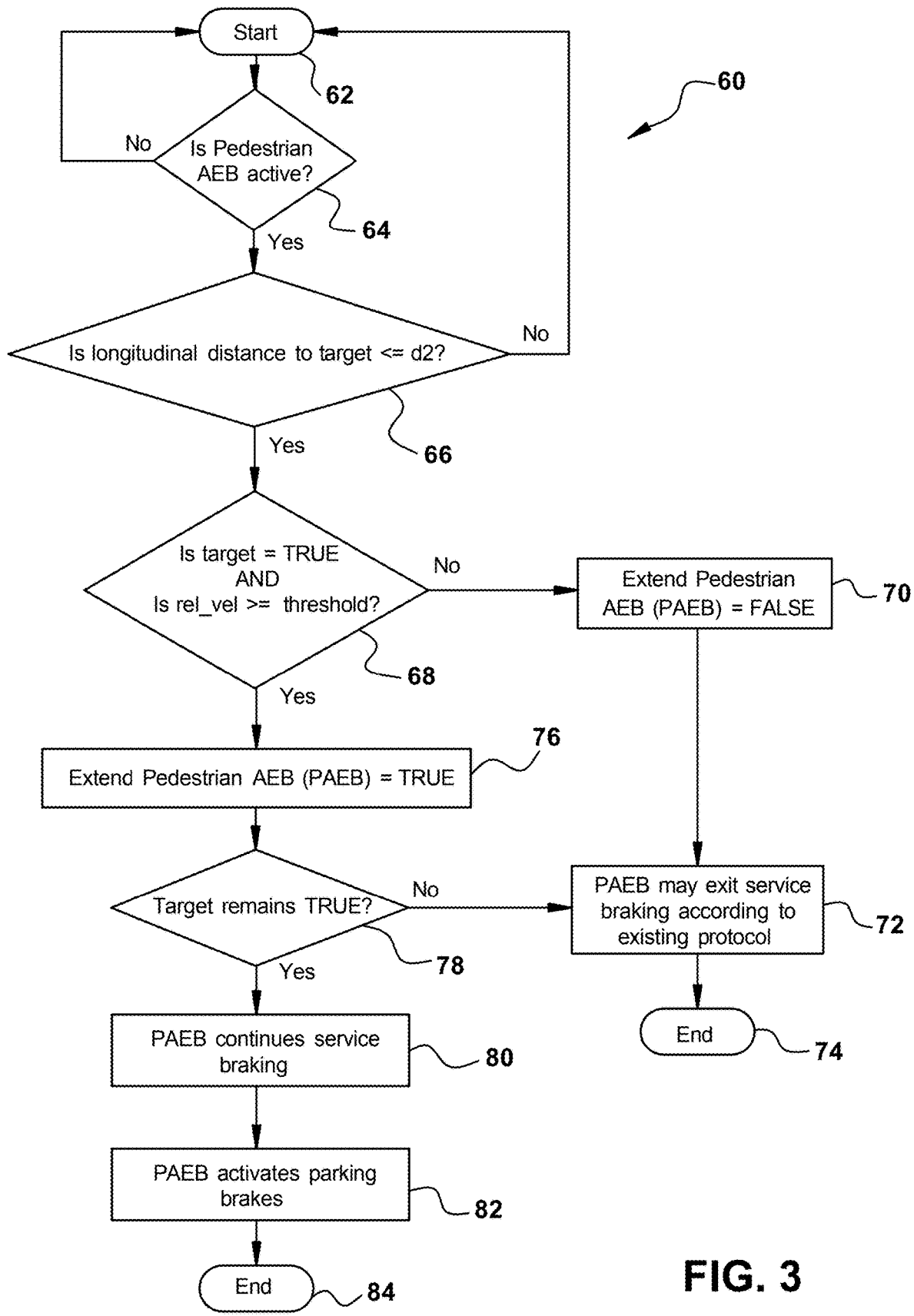
FIG. 3 is a flowchart of the operation of the system as in FIG. 1.

FIG. 3 shows a method 60 of implementing the pedestrian watch algorithm using the system 10.

In step 62, the method 60 begins. In step 62, the pedestrian automated emergency braking may be active. The system 10 may be deactivated in special situations such as when the driver manually disables the system, the camera 18, radar 20 and other sensors 22 are in an error state from a failed self-diagnosis or uncalibrated or are blocked or blind. If the driver or other system on the vehicle 40 has disabled the system 10, either through a manual switch or communication message, then the method 60 returns to step 62. In another embodiment, the system 10 may be activated by geolocation, such as when the vehicle 40 is entering a known school zone. If the Pedestrian AEB is activated, the method 60 continues to step 66.

In step 66, the longitudinal distance from the vehicle 40 to the pedestrian 42 is measured via the camera 18 and/or radar 20. If the distance is greater than or equal to d2, a predetermined distance, then the method 60 returns to step 62. The system 10 assumes that at distance d2 or greater, the pedestrian 42 is fully visible to the driver and the camera 18 such that the regular obstacle detection will be active. If the distance is less than d2, the method 60 continues to step 68.

In step 68, the relative velocity of the vehicle 40 with respect to the detected pedestrian 42 is measured. If the relative velocity is greater than or equal to a predetermined threshold, the method proceeds to step 70. The predetermined threshold velocity may be −3.5 m/s. In step 70, the extended Pedestrian Automatic Emergency braking is set to false. In step 72, the Pedestrian AEB continues to function without the extended mode and the service braking may be released when no target is detected. The method 60 ends at step 74.

However, If the relative velocity is less than a predetermined threshold in step 66, the method 60 continues to step 76. This means that the pedestrian 42 is likely moving in such a way as to be in the front blind spot of the vehicle 40. In step 76, the extended pedestrian AEB is set to true. If the pedestrian 42 is no longer being reliably detected as a target in step 76, the extended pedestrian AEB remains true and Pedestrian AEB is allowed to continue to request service braking in step 78.

If the target detection is not reliable in step 78, then the method 60 goes directly to step 82 where the vehicle is parked via a request to the parking brake controller 16. In step 84, the method 60 ends.

A vehicle having this system is especially useful when the vehicle is passing known areas with frequent child pedestrian crossings, such as near schools. The system may be activated only when in these locations or the system may be active during the entire operation of the vehicle.

Therefore, a method for controlling a commercial vehicle comprises detecting a pedestrian with at least one forward camera, determining a distance to the pedestrian is less than or equal to a predetermined distance and transmitting a signal requesting deceleration of the vehicle as long as the pedestrian is detected less than the predetermined distance.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A vehicle system for a commercial vehicle comprising:
    a first forward looking camera;
    a service braking controller; and
    a driver assistance controller communicating with the first forward looking camera and the service braking controller; wherein the driver assistance controller
        identifies a pedestrian as a target within the field of view of the first forward looking camera;
        determines a distance to the pedestrian is less than or equal to a predetermined distance;
        transmits a signal to the service braking controller to request deceleration of the vehicle in response to the distance to the pedestrian being less than or equal to the predetermined distance; and
        maintains the signal to the service braking controller as long as the driver assistance controller determines that the pedestrian remains a target in response to the pedestrian no longer being detected in a field of view of the first forward camera and not detected at a distance greater than the predetermined distance.

2. The vehicle system as in claim 1, further comprising a parking brake controller in communication with the driver assistance controller, wherein the driver assistance controller transmits a signal to the parking brake controller to park the vehicle in response to the pedestrian remaining a target.

3. The vehicle system as in claim 2, wherein a driver of the vehicle is able to override the signal to the parking brake controller.

4. The vehicle system as in claim 1, wherein the driver assistance controller maintains the signal to the service brake controller until the pedestrian is no longer identified as a target, which occurs when the pedestrian is detected at a distance greater than the predetermined distance.

5. The system as in claim 1, wherein the driver assistance controller and the service brake controller are a single controller.

6. The system as in claim 1, further comprising a second forward looking camera mounted at a location on the vehicle separate from the first forward looking camera, wherein the pedestrian is no longer a target occurs when the second forward looking camera detects the pedestrian as a distance greater than the predetermined distance.

7. A method for controlling a commercial vehicle comprising:
    detecting a pedestrian with at least one forward camera;
    determining a distance to the pedestrian is less than or equal to a predetermined distance;
    transmitting a signal requesting deceleration of the vehicle as long as the pedestrian is detected less than the predetermined distance;
    determining that the pedestrian remains less than a predetermined distance in response to the pedestrian no longer being detected by the at least one forward camera; and
    continuing to transmit the signal requesting deceleration.

8. The method as in claim 7, further comprising maintaining the signal requesting deceleration of the vehicle until the pedestrian is detected at greater than the predetermined distance.

9. The method as in claim 7 further comprising: transmitting a signal to engage a parking brake of the commercial vehicle until the pedestrian has been detected at greater than the predetermined distance.

10. The method as in claim 9, further comprising: overriding the signal to engage the parking brake through an action of the driver of the commercial vehicle.

11. The method as in claim 9 further comprising:
    detecting the pedestrian has moved to greater than the predetermined distance; and
    transmitting a signal to release the parking brake of the commercial vehicle.

* * * * *